United States Patent
Watanabe

[11] 3,886,433
[45] May 27, 1975

[54] CONVERTER CONTROL SYSTEM WITH TAPPED TRANSFORMER PROVIDING CONSTANT NO-LOAD SECONDARY VOLTAGE

[75] Inventor: Atsumi Watanabe, Hitachi, Japan
[73] Assignee: Hitachi, Ltd., Japan
[22] Filed: Aug. 8, 1973
[21] Appl. No.: 386,561

[30] Foreign Application Priority Data
Aug. 21, 1972 Japan.................. 47-80866

[52] U.S. Cl.................. 321/18; 321/40; 321/45 R; 323/43.5 R
[51] Int. Cl...................... H02m 7/12; G05f 5/00
[58] Field of Search........ 321/5, 18, 27 R, 40, 45 R; 323/43.5 R, 43.5 S

[56] References Cited
UNITED STATES PATENTS

| | | |
|---|---|---|
| 3,339,083 | 8/1967 | Uhlmann.................. 321/27 R |
| 3,458,795 | 7/1969 | Ainsworth.................. 321/5 |
| 3,499,165 | 3/1970 | Madzarevic et al.......... 321/27 R |
| 3,746,965 | 7/1973 | Okada et al................ 321/18 |

Primary Examiner—Gerald Goldberg
Attorney, Agent, or Firm—Craig & Antonelli

[57] ABSTRACT

A tapped transformer is inserted between an inverter connected to a DC transmission line and an AC system, the transformer being so controlled as to maintain a constant no-load secondary voltage. An inverter is so controlled that if DC current therein is below a rated value thereof, the DC voltage is maintained constant, whereas the extinction angle is maintained constant in the event of the DC current exceeding the rated value. It is further so controlled that in the event that a sudden change in the voltage in the AC system is detected, the extinction angle of the inverter is increased.

4 Claims, 8 Drawing Figures

PATENTED MAY 27 1975     3,886,433

SHEET 1

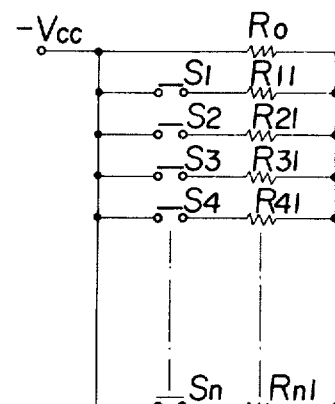
FIG. 5a
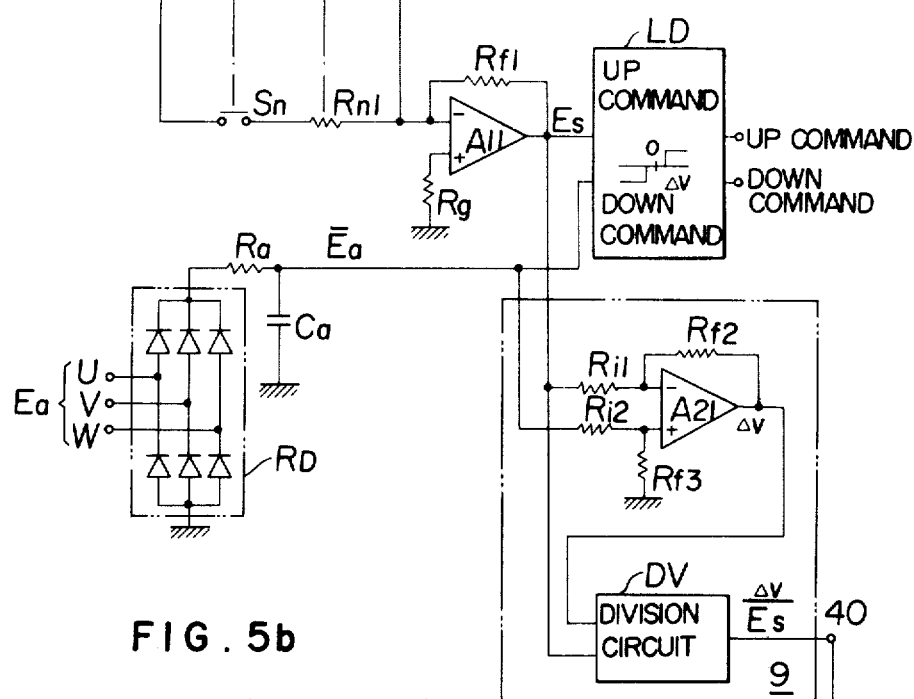
FIG. 5b
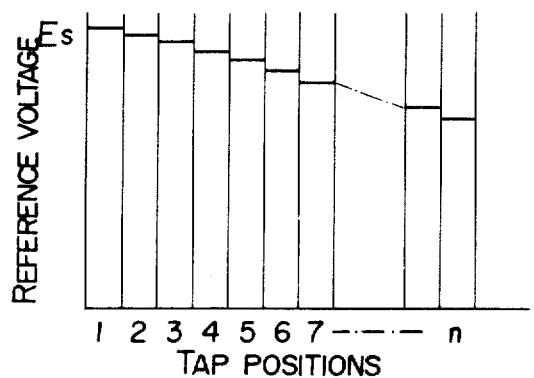

CONVERTER CONTROL SYSTEM WITH TAPPED TRANSFORMER PROVIDING CONSTANT NO-LOAD SECONDARY VOLTAGE

The present invention relates to a control system for a high-power converter used for DC transmission or more in particular to a control system which is effectively applied to the control of an inverter ("The converter "and" the inverter" may hereinafter be collectively referred to as "the converter").

In DC transmission, AC power is temporarily converted into DC power by a rectifier for transmission purposes and subsequently reconverted into AC power by an inverter to be transmitted to an AC system under load. In this case, the rectifier is generally controlled at a constant current and the inverter at a constant extinction angle.

The reason why the inverter is controlled at a constant extinction angle is to secure stable operation thereof on one hand and to minimize consumption of reactive power by maintaining the extinction angle at a minimal constant value.

This control system itself, in spite of its importance, is not necessarily satisfactory when viewed from the standpoint of quick response to instructions for change in power transmission or voltage variations due to variations in reactive power accompanying changes in power received by a loaded AC system. This fact will be explained more in detail below with reference to a case in which the rectifier is controlled at a constant current and an inverter at constant extinction angle.

The terminal voltage Vd on the DC side (hereinafter referred to as the "DC voltage") of the inverter and the power factor $\cos\phi$ of the inverter are expressed, as well known, by the following equations:

$$Vd = 1.35 \, E_2\cos\delta - 3/\pi \times Id \tag{1}$$

$$\cos\phi = \cos\delta + \cos(\delta+u)/2 \tag{2}$$

where $E_2$ is a secondary no-load voltage of a transformer inserted between the inverter and the AC system under load, the primary and secondary sides thereof being connected to the AC system and the inverter respectively, X the reactance of the transformer per phase, $\delta$ an extinction angle, $u$ an overlapping angle and Id a DC current flowing in the inverter.

As is apparent from equation (1), if the extinction angle is maintained constant, the DC voltage cannot be maintained constant in case of variations in DC current, whereas the smaller the DC current, the higher the DC voltage, the range of variations in DC voltage being about 10% of the rated DC voltage. For this reason, it is common practice to make efforts to maintain a constant DC voltage by controlling the tap position of the transformer by comparing the DC voltage with a reference voltage. This conventional control system, however, has the disadvantage that in view of the fact that, in a minimum range of DC current, the secondary voltage of the transformer is maintained approximately 10 % below by means of the tap in order to control the DC voltage at a low level for system operation, any subsequent efforts to increase the DC current to its rated value to obtain a rated value of the converter output necessarily fails as only about 90 % of the rated power is achieved. To achieve the rated power by raising the voltage by means of the tap usually requires several minutes of time. If the extinction angle is maintained constant, on the other hand, the required apparent power at AC side of the converter is decreased substantially in proportion to the DC current, while at the same time the overlapping angle $u$ is reduced, so that as will be seen from equation (2), the power factor is rapidly improved for quick reduction in the reactive power consumed by the inverter. The result is great variations in reactive power with the increase and decrease in DC power of the converter and hence great variations in AC voltage. This poses a problem especially when the AC system has a small short-circuit capacity.

Accordingly, it is an object of the present invention to provide a control system for a converter which operates readily in conformity with changes in transmitted power.

Another object of the invention is to provide a control system for a converter which is capable of maintaining small variations in AC voltage.

In view of the fact that the slow response to the changes in transmitted power is attributable to the time required for tap control of the transformer, the present invention is characterized in that such time required for tap control is eliminated by maintaining a constant secondary voltage of the transformer on one hand, while reducing variations in AC voltage due to variations in DC power of the converter by properly switching between the DC-voltage regulation and extinction angle regulation of the converter.

The above and other objects, features and advantages will be made apparent by the detailed description taken in conjunction with the accompanying drawings, in which:

FIGS. 5a and 5b are a circuit diagram and graph for explaining an example of the tap control circuit;

Figure 1:
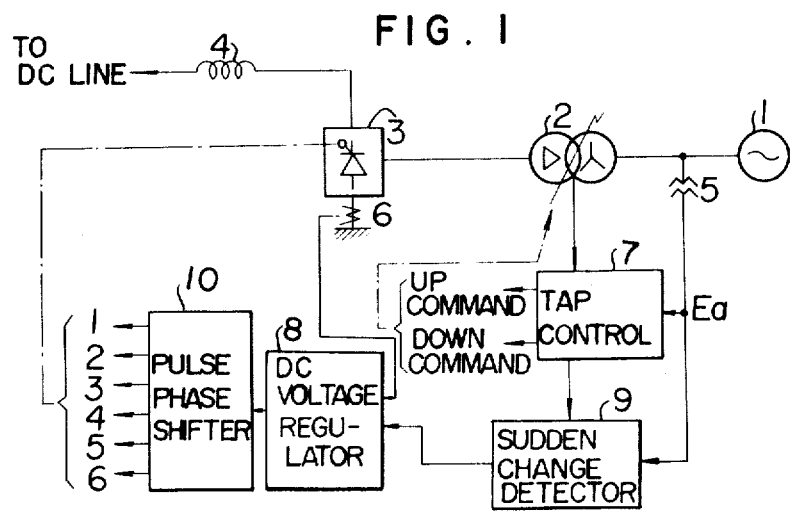
FIG. 1 is a block diagram showing an embodiment of the present invention.

With reference to FIG. 1 showing an embodiment of the invention, reference numeral 1 shows an AC system, numeral 2 a transformer, numeral 3 a three-phase full-wave thyristor bridge, numeral 4 a DC reactor, numeral 5 a voltage transformer for measuring an AC terminal voltage, numeral 6 a DC current transformer for measuring DC current, numeral 7 tap control circuit for the transformer, numeral 8 a DC voltage regulation circuit, numeral 9 a circuit for detection of a sudden change in AC voltage, and numeral 10 a pulse phase shifter.

The fundamental operation of the system according to the present invention will be first explained below, followed by detailed explanation thereof with reference to FIGS. 2 to 6.

The tap control circuit 7 is such that the tap is controlled to maintain constant the secondary no-load voltage of the transfomer all the time regardless of any changes in voltage of the AC system. Under normal conditions, only direct current is applied to the DC voltage regulation circuit 8, so that the DC voltage is maintained constant without regard to variations of the direct current within a certain limit. For this purpose, an appropriate voltage is applied to the pulse phase shifter 10 to control the controlling angle of advance of the thyristor bridge. When the certain limit is exceeded by the direct current, the controlling angle of advance is regulated so as to be constant regardless of the magnitude of the direct current. The term "controlling angle of advance" used herein is expressed as $\delta+u$ as aforementioned. In this connection, the controlling delay angle $\alpha$ which will be described later is the one indicated by $\alpha = \pi-(\delta+u)$. The circuit 9 for detection of a sudden voltage change does not operate normally except when it is required to avoid commutation failure of the inverter in the case of an AC voltage drop due to a short-circuiting or other ground faults which may occur so suddenly in the AC system as to preclude the timely follow-up operation of the tap, the detailed explanation of the circuit 9 being made later with reference to FIGS. 2, 5 and 6.

As will be apparent from the above explanation, the present invention is characterized in that the secondary voltage of the transformer is maintained at the same level as when a rated current flows, so that it is possible to obtain full rated electric power immediately after the operation of the system at a converted power of, say, 10% of the rated value. Further, a constant power factor is achieved by the fact that the DC voltage is maintained constant regardless of any variations in direct current, with the result that undesirable reduction in reactive power consumed by the converter which otherwise might occur at a small direct current is avoided. The fact that the power factor is fixed under a constant direct voltage is obvious, as is well known, from the comparison of equation (2) with equation (3) below which is an alternative form of equation (1) above.

$$Vd = 1.35 E_2 \cos\delta + \cos(\delta+u)/2 \quad (3)$$

As already mentioned, when the predetermined level is exceeded by the direct current, the extinction angle is maintained constant so that commutation failure of the converter is avoided thereby to assure stable operation of the system.

The embodiment of the invention will be explained more in detail now with reference to FIGS. 2 to 6.

Figure 2:
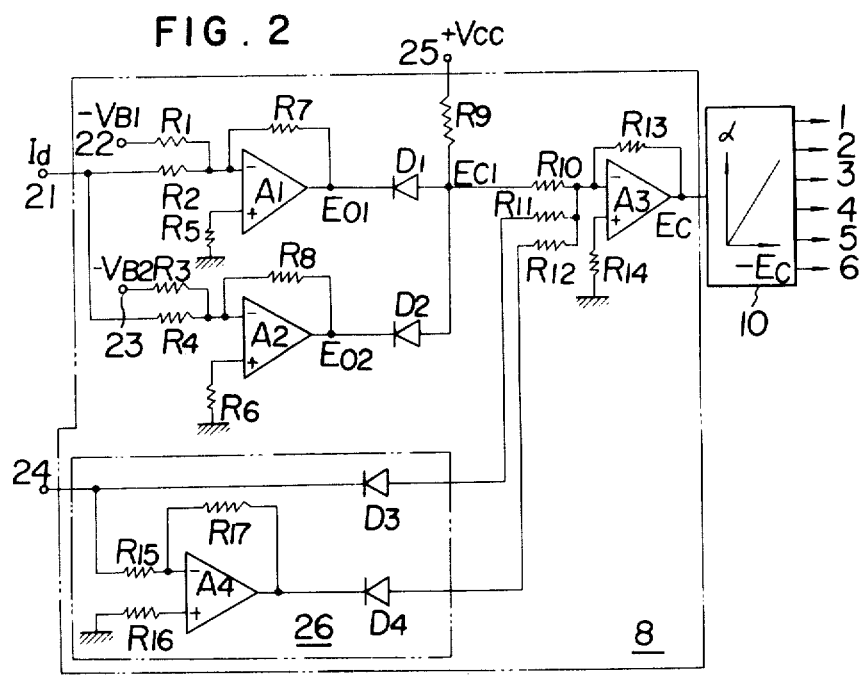
FIG. 2 is a circuit diagram schematically showing an example of the DC voltage regulation circuit included in the circuit of FIG. 1.
Figure 3:
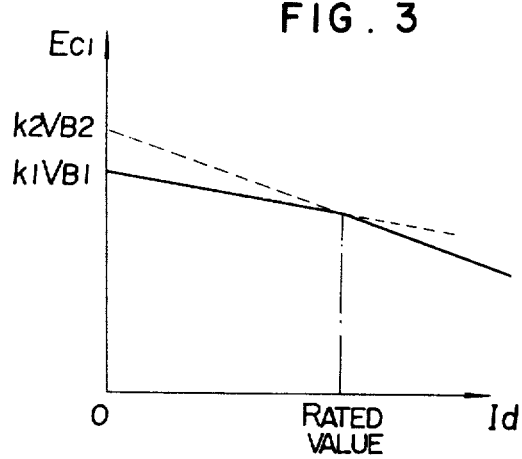
FIGS. 3 and 4 are characteristics diagrams for explaining the operation of the circuit of FIG. 2.

An actual example of the DC voltage regulation circuit 8 of FIG. 1 is illustrated in FIG. 2, the operation thereof being explained later with reference to FIGS. 3 and 4.

Reference symbols $A_1$, $A_2$ and $A_3$ in FIG. 2 show operational amplifiers. Outputs $E_{01}$ and $E_{02}$ of the operational amplifiers $A_1$ and $A_2$ are the results of multiplying the measured value Id of direct current (converted into a voltage) and bias voltages respectively by gains determined by resistors $R_1$ to $R_8$ and adding them to each other, as given below.

$$E_{01} = k_1 V_{B1} - k_1' Id \quad (4)$$

$$E_{02} = k_2 V_{B2} - k_2' Id \quad (5)$$

where $k_1 = R_7/R_1$, $k_1' = R_7/R_2$, $k_2 = R_8/R_3$, and $k_2' = R_8/R_4$.

The resistor $R_9$ and diodes $D_1$ and $D_2$ make up a circuit for selecting the lower of the voltages $E_{01}$ and $E_{02}$, which lower voltage is produced as an output $E_{C1}$. An example of the relation between the direct current Id and the voltage $E_{C1}$ is as shown in FIG. 3. The gradient and intersection of the two curves may be determined at will depending on the manner in which $k_1$, $k_1'$, $k_2$ and $k_2'$ in equations (4) and (5) are selected. When the output of the sudden voltage drop detection circuit 9 which is applied to the terminal 24 is zero, the voltage $E_{C1}$ is converted in polarity into $E_C$ by the operational amplifier $A_3$, which voltage $E_C$ constitutes a control voltage for the pulse phase shifter 10. Assuming that $R_{10} = R_{13}$, $E_C = -E_{C1}$. Also, assume that the characteristics of the pulse phase shifter 10 are such that the voltage $E_C$ is directly proportional to the controlling delay angle $\alpha$, as shown in FIG. 2. The relation between direct current Id and controlling delay angle $\alpha$ assumes the same curve as that shown in FIG. 3.

The manner in which the bias voltages $k_1 V_{B1}$, $k_2 V_{B2}$ and gains $k_1'$, $k_2'$ are determined will be explained below with reference to FIG. 4, which shows the result of calculation by means of equation (3) and the well-known equation (6) below.

$$\left. \begin{array}{c} \cos\delta - \cos(\delta+u) = \sqrt{2} \times Id/E_2 \\ \\ \alpha = 180° - (\delta+u) \end{array} \right\} \quad (6)$$

Figure 4:
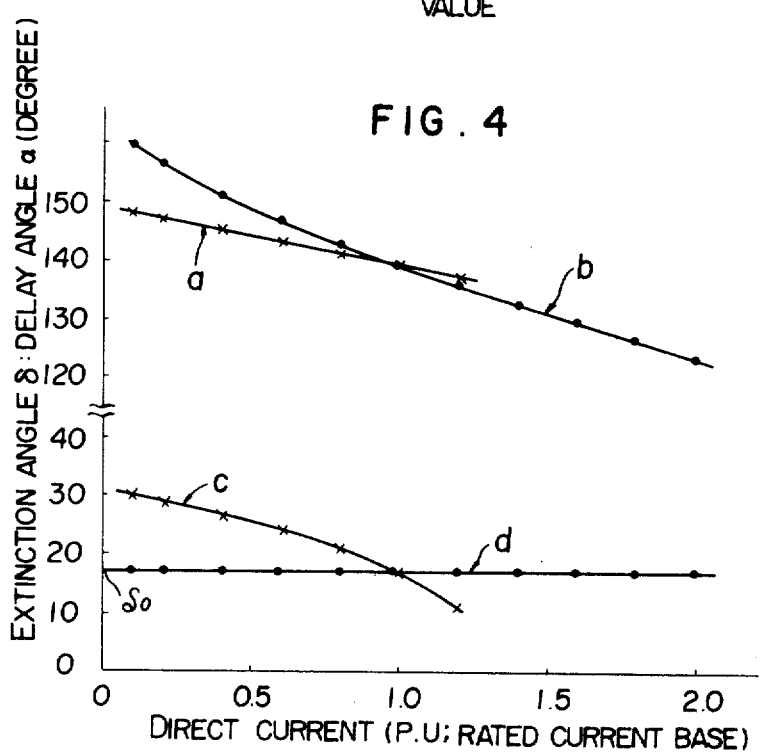

In FIG. 4, the curve (a) shows the values of controlling delay angle $\alpha$ to be selected in order to maintain a constant DC voltage Vd regardless of variations of Id, on the assumption that the secondary voltage $E_2$ of the transformer is constant. The curve (b) represents, on the other hand, the values of controlling delay angle $\alpha$ for maintaining the extinction angle $\delta$ at a constant level without regard to any changes in Id, also assuming that $E_2$ is constant. Further, curve (c) shows the values of extinction angle $\delta$ as the controlling operation is performed along the curve (a). Furthermore, the curve (d) indicates extinction angle $\delta$ as the curve (b) is followed and is necessarily maintained at a constant level.

The objects of the invention are achieved by performing the controlling operation along the curve (a). Such controlling operation suffices under normal conditions. As will be seen from the drawings, however, when the direct current exceeds the rated value for some reason or other, the extinction angle $\delta$ is reduced below a normal value $\delta_0$, inviting the risk of commutation failure. To avoid this risk, it is necessary to secure the required extinction angle by following the curve (b) in controlling operation. Thus, always stable control is possible by following the curves (a) and (b) depending on whether the direct current is smaller or larger than the rated value thereof respectively. It will be seen from the drawing that the portions of curves (a) and (b) which are followed for the controlling operation substantially comprise a straight line and therefore the intended controlling operation is accomplished by the piece-wise linear approximation circuit of FIG. 2. The values $k_1 V_{B1}$, $k_2 V_{B2}$, $k_1'$ and $k_2'$ shown in equations (4) and (5) are easily determined by figuring out similar curves to those shown in FIG. 4 for each specific case.

An embodiment of the tap control circuit with a fixed secondary no-load voltage of the transformer is shown in FIG. 5. During the commutating operation of the converter, a short-circuiting occurs between the secondary terminals of the transformer and the voltage therebetween is reduced to zero, so that it is impossible to measure the no-load voltage across the secondary side of the transformer. In the embodiment of FIG. 5, different reference voltages depending on the tap position are generated by means of contacts for tap position indication, so that the primary voltage is compared with the reference voltages to issue an order to raise or lower the tap position. In the same drawing, reference symbols $S_1, S_2, \ldots S_n$ show switches indicating the different tap positions, one of which is closed at a given time according to the tap position. A negative DC reference voltage $-Vcc$ is applied to one of the terminals of each of the switches, while the other terminal thereof is connected through resistors $R_{11}, R_{21}, \ldots R_{n1}$ of different resistance values to the input terminal of the DC amplifier $A_{11}$. The resistor $R_0$ is provided for the purpose of applying the voltage $-Vcc$ to the input terminal of the DC amplifier $A_{11}$ directly through no switch. The other terminal of the DC amplifier $A_{11}$ is grounded through a resistor Rg. In view of the fact that the output of the DC amplifier $A_{11}$ is fed back to the input terminal thereof through the resistor $Rf_1$, the output Es of DC amplifier $A_{11}$ is $$Es = Vcc \ (R_f/R_i + R_f/R_o) \quad (7)$$

where $Ri$ is a resistance connected in series with a switch equivalent to the closed tap position $i$, the voltage $Es$ being shown in FIG. 5b. If Es is selected to satisfy the equation "$Es \cdot Ni$ = normal value" on the assumption that the ratio of secondary voltage $V_2$ of the transformer to primary voltage $V_1$ thereof at the tap position $i$ is Ni, it follows that a reference primary voltage is obtained to maintain a constant secondary voltage. As is shown in FIG. 5, the AC voltage Ea of the primary side of the transformer is rectified and smoothed by the resistor Ra and capacitor Ca into voltage $\overline{Ea}$, and then it is compared with the voltage Es by the level comparator LD. If $\overline{Ea}$ is larger than Es, an order to raise the transformer tap is issued. The value Ni becomes smaller as the tap position is raised, and therefore the voltage Es is progressively increased until the tap is stopped at a position where Es is equal to $\overline{Ea}$. When $\overline{Ea}$ is smaller than Es, by contrast, an order to lower the tap position is issued.

It will be understood from the above description that the circuit of FIG. 5 makes it possible to maintain constant the secondary no-load voltage of the transformer.

The objects of the present invention which are first above mentioned are successfully achieved under normal conditions by a combination of the circuits of FIGS. 2 and 5. However, in case of a sudden change in AC voltage due to such causes as a fault of the AC system, some special countermeasure is required as the tap is unable to respond to the fault immediately. This problem is solved by the circuits defined by the dashed lines in FIGS. 2 and 5, respectively indicated at reference numerals 26 and 9. In FIG. 5, RaCa is relatively small in value, and therefore a sudden change in AC voltage Ea is followed within a very short time by an appropriate operation. The difference $\Delta V$ between Es and $\overline{Ea}$ at that time is calculated by the differential amplifier $A_{21}$, whereupon $\Delta V/Es$ is obtained by the divider circuit DV. $\Delta V/Es$ is an indication of the deflection of the AC voltage from the normal value employing as a base the same normal value, that is, the primary voltage for producing a rated secondary voltage. In the event of small variations in voltage under normal conditions, Es undergoes very little change, so that the divider circuit DV may be omitted to use $\Delta V$ itself as an output. The deflection thus calculated is applied to the circuit of FIG. 2 by the terminal 40 connected to the terminal 24 of the same figure, thereby performing the phase control. The system for such phase control will be explained with reference to FIG. 6.

Figure 6:
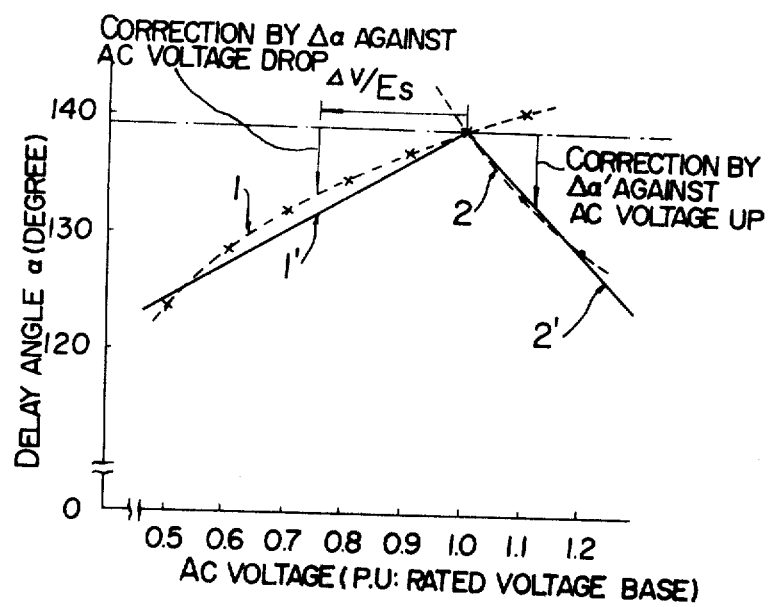
FIG. 6 is a characteristics diagram for explaining the advantage of the circuit of FIG. 1 for detection of a sudden change in the AC voltage.

The curve (1) of FIG. 6 is the result of calculation by equation (6) effected to determine how the controlling delay angle $\alpha$ should be changed to maintain the extinction angle $\delta$ constant regardless of variations in AC voltage under fixed DC current. The graph of FIG. 6 indicates that the controlling delay angle $\alpha$ should be changed by $\Delta \alpha$ against the deflection of $\Delta V/Es$. By effecting the control operation in this way, it is possible to achieve stable operation of the system with the required extinction angle $\delta$ secured without regard to changes in AC voltage. If the control following the curve (1) is effected when the AC voltage is raised above the normal value thereof, the direct current is increased beyond its rates value accordingly. This does not pose any problem if there is a sufficient insulation level of the equipment on DC side. It is, however, desirable to maintain the DC voltage below the rated value thereof by pulse phase control, since an excess voltage should be avoided in any case. The curve (2) of FIG. 6 shows the result of calculation of controlling delay angle $\alpha$ on the basic of equations (1) and (2) for maintaining a constant DC voltage regardless of any variations in AC voltage while maintaining a constant direct current.

To summarize, if the AC voltage is reduced below its rated value, the control is effected following the curve (1) thereby to secure the required extinction angle, whereas if the AC voltage is increased beyond the rated value, the curve (2) is followed for purposes of control operation thereby to prevent flash over which otherwise might occur due to an increased DC voltage.

By employing the circuit shown by reference numeral 26 of FIG. 2, it is possible to effect control by straight lines (1)' and (2)' approximate to the curves (1) and (2) of FIG. 6. A control with higher accuracy is possible by the use of piece-wise linear approximation, but a control circuit using the straight-line approximation will be explained below for the sake of simplicity.

Since $\Delta V/Es$ is produced as a negative voltage when the AC voltage Ea is below the rated value Es, the diode $D_3$ in the circuit 26 conducts, so that the control voltage Ec of the pulse phase shifter 10 depending on the ratio $R_{13}/R_{11}$ is reduced thereby to decrease the controlling delay angle $\alpha$, the ratio $R_{13}/R_{11}$ being determined according to the straight line (1)' of FIG. 6. Next, when Ea is increased beyond Es, the output of operational amplifier $A_4$ in the circuit 26 becomes negative, so that the diode $D_4$ begins its conduction to reduce Ec. The gradient of the reduction is determined in accordance with the straight line (2)' of FIG. 6 by appropriately selecting the resistors $R_{15}, R_{17}, R_{12}$ and $R_{13}$.

Figure 7:
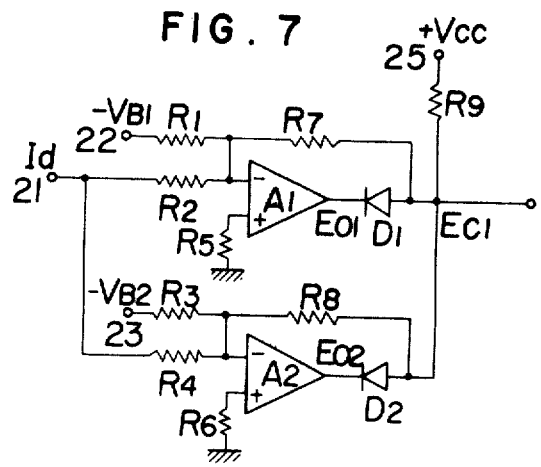
FIG. 7 is a circuit diagram showing another example of the minimum value calculation circuit included in the DC voltage regulation circuit.

The diagram of FIG. 7 shows another example of the minimum value selection circuit which is used to select the output $E_{o1}$ or $E_{o2}$, whichever is lower, of the operational amplifiers $A_1$ and $A_2$ of FIG. 2. As is apparent from the comparison between the two diagrams having the same reference numerals attached to similar component elements, the circuit of FIG. 7 is characterized in that the resistors $R_7$ and $R_8$ are connected in parallel with the operational amplifiers and diodes $D_1$ and $D_2$ respectively, and therefore it is possible to select the minimum value with the blocking-layer voltage of the diodes completely eliminated. This also applies to the circuit including the operational amplifer $A_1$ and the diode $D_1$, although it is not illustrated in the drawing.

As will be noted from the above explanation, according to the present invention, the direct voltage or extinction angle is selectively maintained constant for purposes of control operation depending on the value of direct current and that when effecting control operation by making the DC voltage constant, the secondary voltage of the transformer is capable of being maintained at its rated value, thus making it possible to increase immediately the power transmission by increasing the direct current.

Referring to variations in reactive power due to variations in direct current, the invention is such that the power factor is fixed throughout the duration of control by constant DC voltage, so that the sudden reduction in reactive power due to a reduced overlapping angle u and an improved power factor which otherwise might occur at a small current is avoided, with the result that voltage variations due to variations in reactive power in the AC system are maintained comparatively low.

However, the problem is at what value of direct current the transfer should be made between the control of an inverter by a constant voltage and that by a constant extinction angle. Such a transfer point need not necessarily be at or in the neighborhood of the rated current. In other words, if the magnitude of the extinction angle which is indispensable for stable operation of the inverter is large enough, the control by constant DC voltage may be effected for a direct current larger than the rated value thereof. If the extinction angle is small, on the other hand, it is recommended that control by constant extinction angle be effected with the direct current smaller than the rated value thereof. Further, by determining the transfer point from the control by constant DC voltage to the control by constant extinction angle at a small value of the direct current, stable utilization of direct current transmission is possible even if the AC system has a small reactive-power supply capacity. If control by constant DC voltage is possible up to a large value of the direct current, on the other hand, the system functions substantially as the phase midifier of a sort through DC transmission.

Although the above description refers to a control system for maintaining the DC voltage on the inverter side, it is possible to effect a similar control for maintaining the DC voltage constant on the rectifier side. For this purpose, in determining the gradient of the controlling curve of FIG. 3, the voltage drop $R_l Id$ due to the DC line may be added to the right side of the equation (3), so that a similar calculation to the one associated with FIG. 4 is conducted to determine the circuit constants.

What is claimed is:

1. In a converter control system applied to a system comprising a converter connected to a DC line and a tapped transformer for connecting said converter to an AC system; the improvement comprising a circuit for generating a reference voltage varying with the position of said tap of said transformer, a circuit for generating a voltage proportional to the primary voltage of the transformer, first means for comparing the voltages of said two circuits and controlling the position of the tap of said transformer, a circuit for generating a voltage corresponding to the controlling delay angle required for maintaining constant the terminal voltage on the DC side of said converter depending on the value of direct current flowing in said converter, a circuit for generating a voltage corresponding to the controlling delay angle required for maintaining constant the extinction angle of said converter depending on the value of the direct current flowing in said converter, and second means for selecting one of the voltages generated by last-mentioned two circuits and applying a firing pulse or a controlling delay angle corresponding to said selected voltage to said converter.

2. A converter control system according to claim 1, further comprising third means for enlarging the controlling angle of advance of said converter in response to the voltage proportional to the rate of a sudden change in the voltage of said AC system.

3. A converter control system for a DC power transmission system comprising a converter having its DC terminals connected to a DC line through at least a DC reactor and its AC terminals connected to an AC system through a tapped transformer, the converter control system including means for controlling the tap of said transformer to make the no-load voltage on the secondary side of said transformer constant regardless of voltage variations in said AC system, first regulator means providing an output for adjusting the controlling delay angle of said converter to make the DC terminal voltage of said converter constant, second regulator means providing an output for adjusting the controlling delay angle of said converter to make the extinction angle of said converter constant, selecting circuit means for selecting one of the outputs of said first and second regulator means, and pulse phase shifter means for generating a firing pulse corresponding to an output from said selecting circuit means.

4. A converter control system according to claim 3, further including detection circuit means for detecting a deviation from a reference level for the secondary voltage of said transformer, the deviation being caused by a sudden voltage variation in said AC system, and advance circuit means for advancing the controlling delay angle of said converter according to the detected deviation.

* * * * *